(12) United States Patent
Wallerath et al.

(10) Patent No.: US 11,637,422 B2
(45) Date of Patent: *Apr. 25, 2023

(54) ELECTRONIC DEVICE

(71) Applicant: APTIV TECHNOLOGIES LIMITED, St. Michael (BB)

(72) Inventors: Joerg Wallerath, Essen (DE); Emmanuel Boudoux, Cologne (DE)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 17/850,317

(22) Filed: Jun. 27, 2022

(65) Prior Publication Data

US 2022/0329062 A1 Oct. 13, 2022

Related U.S. Application Data

(63) Continuation of application No. 17/025,329, filed on Sep. 18, 2020, now Pat. No. 11,374,399.

(30) Foreign Application Priority Data

Sep. 27, 2019 (EP) .................................... 19200045

(51) Int. Cl.
*H02H 7/26* (2006.01)
*H02H 9/02* (2006.01)
*H02J 4/00* (2006.01)

(52) U.S. Cl.
CPC ............. *H02H 7/262* (2013.01); *H02H 9/02* (2013.01); *H02J 4/00* (2013.01)

(58) Field of Classification Search
CPC ... H02H 9/02; H02H 7/262; H02J 1/06; H02J 1/10; H02J 4/00

USPC .......................................................... 307/38
See application file for complete search history.

(56) References Cited

U.S. PATENT DOCUMENTS

2016/0359333 A1 12/2016 Chen et al.
2018/0115191 A1* 4/2018 Stewart ............. H02J 13/00014
2020/0233441 A1* 7/2020 Morimoto ............... B60L 1/006

FOREIGN PATENT DOCUMENTS

EP 3313021 A1 4/2018

OTHER PUBLICATIONS

Extended European Search Report for Application No. EP 19200045.3 dated Feb. 11, 2020.

* cited by examiner

*Primary Examiner* — Kevin J Comber
(74) *Attorney, Agent, or Firm* — Carlson, Gaskey & Olds, P.C.

(57) ABSTRACT

An electronic device for series connection on a power supply line includes a plurality of switches and a control unit configured to perform the following steps: operating error detection means during operation of the device in a first mode; operating the device in a second mode in response to an erroneous power state being detected by the error detection means during operation of the device in the first mode; operating the error detection means during operation of the device in the second mode in order to determine an error location associated with the erroneous power state detected by the error detection means during operation of the device in the first mode.

10 Claims, 12 Drawing Sheets

Figure 1:
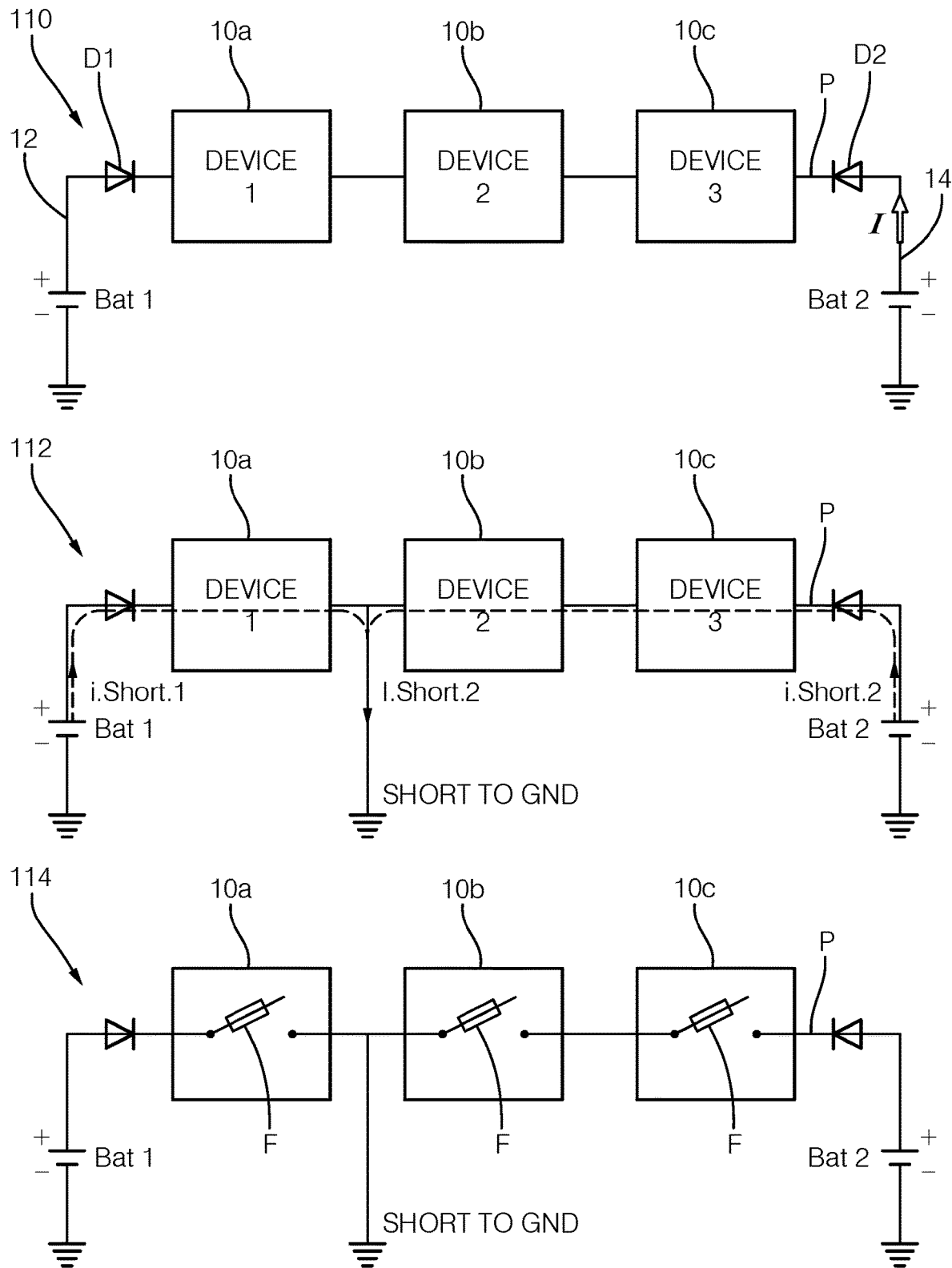

| RAIL SHORT LEFT | RAIL SHORT RIGHT | LOAD SHORT | NODE SHORT | RAIL SWITCH LEFT | RAIL SWITCH RIGHT | LOAD SWITCH |
|---|---|---|---|---|---|---|
| YES | YES | YES | YES | OPEN | OPEN | OPEN |
| YES | YES | YES | NO | OPEN | OPEN | OPEN |
| YES | YES | NO | YES | OPEN | OPEN | OPEN |
| YES | YES | NO | NO | OPEN | OPEN | OPEN |
| YES | NO | YES | YES | OPEN | OPEN | OPEN |
| YES | NO | YES | NO | OPEN | OPEN | OPEN |
| YES | NO | NO | YES | OPEN | OPEN | OPEN |
| YES | NO | NO | NO | OPEN | CLOSE | CLOSE |
| NO | YES | YES | YES | OPEN | OPEN | OPEN |
| NO | YES | YES | NO | CLOSE | OPEN | OPEN |
| NO | YES | NO | YES | OPEN | OPEN | OPEN |
| NO | YES | NO | NO | CLOSE | OPEN | CLOSE |
| NO | NO | YES | YES | OPEN | OPEN | OPEN |
| NO | NO | YES | NO | CLOSE | CLOSE | OPEN |
| NO | NO | NO | YES | OPEN | OPEN | OPEN |
| NO | NO | NO | NO | CLOSE | CLOSE | CLOSE |

FIG. 13

ELECTRONIC DEVICE

CROSS REFERENCE TO RELATED APPLICATIONS

This application is a continuation of U.S. patent application Ser. No. 17/025,329, filed Sep. 18, 2020, now U.S. Pat. No. 11,374,399, which claims priority to European Patent Application No. EP 19200045.3.

FIELD

The present disclosure relates to an electronic device for series connection on a power supply line.

BACKGROUND

Series connection of a plurality of electronic devices on a single supply line saves wiring harness compared to parallel connection. The supply line, which can be configured as a rail, typically has two or more power sources, e.g. batteries, connected to the ends of the supply line, wherein one of the ends can be used for main supply and the other end can be used for backup supply. The advantage of this topology compared to a star or a ring topology is its inherent simplicity. Additionally, cost reductions can be achieved because of reduced cable length.

One inherent drawback of a single rail supply topology is the mutual interference in case of an erroneous power state, in particular a short circuit. Since the devices as well as the power sources are typically protected with fuses a short circuit current will be detected multiple times, wherein several fuses may be triggered and, hence, the rail may be interrupted at one or more locations until the current flow stops. In this situation, the rail is interrupted and the devices are isolated from any power supply. For continued operation a re-start strategy is required, which is a challenge especially for those devices which are not directly connected to one of the power sources.

Accordingly, there is a need to provide an improved electronic device for series connection on a power supply line.

SUMMARY

An illustrative example embodiment is directed at an electronic device for series connection on a power supply line. The device includes a plurality of switches comprising at least a first switch, a second switch, and a third switch, each of the switches having a first terminal, a second terminal, and a control terminal. The first terminals of the first switch, the second switch, and the third switch are connected to a common node of the device. The second terminals of the first switch and the second switch are configured for connection to a first section and a second section of the power supply line, respectively, so that the power supply line extends through the device via the common node if the first section and the second section are connected to the second terminals of the first switch and the second switch, respectively. The second terminal of the third switch is connected to a load. A control unit is configured to set the switching states of the plurality of switches to an open state or a closed state by controlling the control terminals of the plurality of switches. The first terminal and the second terminal of a respective one of the plurality of switches are connected to each other in the closed state and isolated from each other in the open state.

The device further comprises error detection means for detecting an erroneous power state at the common node, wherein the control unit is further configured to operate the device in a first mode or at least a second mode, wherein if the device is operated in the first mode, the control unit sets the switching states of the plurality of switches according to a first pattern, wherein if the device is operated in the second mode, the control unit sets the switching states of the plurality of switches according to a second pattern.

The control unit is further configured to perform the following steps: operating the error detection means during operation of the device in the first mode; operating the device in the second mode in response to an erroneous power state being detected by the error detection means during operation of the device in the first mode; operating the error detection means during operation of the device in the second mode in order to determine an error location associated with the erroneous power state detected by the error detection means during operation of the device in the first mode.

The device can be selectively operated in one of at least two different modes, which may be regarded as operational modes of the device. The first mode can be a regular operational mode, wherein all switches are preferably closed so that the load can be supplied via the first and second switches. During the first mode, an error occurring somewhere, e.g. on the power supply line, will be detected by the error detection means and the device will be switched to the second mode. In the second mode, the location of the error can be determined. With knowledge of the error location various control actions can be performed in order to minimize the impact of the error on the operation of the respective device and possible further devices connected in series on the same supply line as the respective device. In particular, continued use of the supply line is achieved in various error scenarios, which is not possible when using more simple fusing concepts indicated above.

The device can be installed for example in a vehicle, wherein the vehicle can satisfy increased safety requirements. In particular, the vehicle can provide automated or autonomous driving functions by using the device. The device can be formed, e.g. by a controller that is configured to provide an automatic or autonomous driving function. The device can be connected with other devices in series on a supply line of the vehicle, wherein comparably small amounts of wiring harness is used. Although the devices are connected in series safe operation is ensured. Said load connected to the third switch can be part of the device, for example of the controller.

According to an embodiment, the first pattern comprises one of the following state configurations for the plurality of switches: the first switch is in the open state and the second and third switches are in the closed state; the second switch is in the open state and the first and third switches are in the closed state; or the first, second, and third switches are in the closed state. The second pattern comprises at least one of the following state configurations for the plurality of switches: the first, second, and third switches are in the open state; the first and second switches are in the open state and the third switch is in the closed state; the first switch is in the closed state, the second switch is in the open state, and the third switch is in the open or closed state; the first switch is in the open state, the second switch is in the closed state, and the third switch is in the open or closed state.

It is understood that in some state configurations of the second pattern the third switch can be either open or closed.

It is, however preferred that the third switch is open in these cases, as the step of determining the error location is better defined and more efficient.

According to an embodiment, the second pattern comprises a plurality of state configurations for the plurality of switches, wherein the control unit is configured to set the switching states of the plurality of switches to the plurality of state configurations of the second pattern during operation of the device in the second mode, wherein the plurality of state configurations are set sequentially according to a predefined order.

Setting the switching states to different configurations during operation in the second mode allows monitoring different current paths connected to the device, thereby checking different possible error locations. Having a predefined or fixed sequence of different state configurations, which is defined through the second pattern, is useful when a plurality of different devices are connected to the same supply line in series. The predefined sequence is then preferably the same for all devices, wherein an implicit synchronization of the second mode is achieved. It is not necessary to coordinate the devices between each other. Each device can act on its own but in the same manner due to a consistent second pattern. It can then be ensured that no undefined error states are caused due to undesirable combinations of different state configurations between the devices.

According to an embodiment, the second pattern comprises a first time period in which the switching states are set according to at least one of a first state configuration or a second state configuration, wherein the first state configuration defines that the first and second switches are in the open state and the third switch is in the closed state, wherein the second state configuration defines that the first, second, and third switches are in the open state. If the erroneous power state is detected during the first time period, the error location is determined to be inside the device. The term "inside" can be defined as an electrically connective area between the first terminals of the first and second switches and the load.

According to an embodiment, the first time period comprises a first portion in which the switching states are set according the first state configuration, wherein the first time period comprises a second portion in which the switching states are set according to the second state configuration. If the erroneous power state is detected by the error detection means during the first portion of the first time period but not during the second portion of the first time period, the error location is determined to be inside the device between the first terminals of the first, second, and third switch. If the erroneous power state is detected by the error detection means during the first and second portion of the first time period, the error location is determined to be inside the device between the load and the second terminal of the third switch.

The second portion of the first time period can be subsequent to the first portion of the first time period. However, it is possible to reverse the order of the associated first and second state configurations. The error location can then be determined without joint consideration of both time periods. This is, after activation of the second state configuration (all switches open) the error location can directly be determined to be inside the device between the first terminals of the first, second, and third switch if the erroneous power state is detected during the respective portion of the time period. Likewise, the error location can directly be determined to be between the load and the second terminal of the third switch if the first state configuration (first and second switches are in the open state and the third switch is in the closed state) is activated afterwards and the erroneous power state is then detected.

According to an embodiment, the second pattern comprises a second time period in which the switching states are set according to at least a third state configuration or a fourth state configuration, wherein the third state configuration defines that the first switch is in the closed state, the second switch is in the open state, and the third switch is in the open or closed state, wherein the fourth state configuration defines that the first switch is in the open state, the second switch is in the closed state, and the third switch is in the open or closed state. If the erroneous power state is detected during the second time period, the error location is determined to be outside the device. The term "outside" can be defined as an electrically connective area that extends from the second terminals of the first and second switches away from these switches, i.e. away from the device.

The second time period can be subsequent to the first time period, wherein the third switch is preferably in the closed state in the third and fourth state configurations.

According to an embodiment, the second time period comprises a first portion in which the switching states are set according to the third state configuration, wherein if the erroneous power state is detected during the first portion of the second time period, the error location is determined to be outside the device beyond the second terminal of the first switch. The second time period comprises a second portion in which the switching states are set according to the fourth state configuration, wherein if the erroneous power state is detected during the second portion of the second time period, the error location is determined to be outside the device beyond the second terminal of the second switch.

An error location beyond one of the second terminals of the first or second switch preferably indicates an error, e.g. a short circuit, directly connected to one of the respective second terminals of the first or second switch. Directly connected means that no other device is connected between the error location and the respective second terminal.

In general, the error location is determined to be remote from the device if the erroneous power state is not detected by the error detection means during operation of the device in the second mode, e.g. neither during the first time period and the second time period. The error location can be defined to be remote from the device if it is outside the device beyond one of the second terminals of the first and second switches and separated from the device by at least one further device. The at least one further device can be configured in the same way as the respective device.

According to an embodiment, the control unit is further configured to operate the device in the first mode in response to the determined error location if the error location is determined to be remote from the device, wherein the error location is defined to be remote from the device if the erroneous power state is not detected by the error detection means during operation of the device in the second mode. The control unit is further configured to operate the device in a third mode in response to the determined error location if the error location is determined to be not remote from the device, wherein the error location is defined to be not remote from the device if the erroneous power state is detected by the error detection means during operation of the device in the second mode. If the device is operated in the third mode, the control unit sets the switching states of the plurality of switches according to a third pattern in dependence of the error location, wherein the third pattern is adapted to isolate the error location from the power supply line.

According to an embodiment, the control unit is configured to determine the third pattern on the basis of the first pattern and the determined error location, wherein a subset of the switches located directly adjacent to the error location is identified, and wherein the third pattern differs from the first pattern in that the switching states of the subset of switches are in the open state. It can be provided that the control unit comprises a look-up table which outputs the third pattern in response to the error location and the first pattern. In this way, the number of switching operations can be reduced.

According to an embodiment, the control unit is configured to determine the third pattern in dependence of the error location by using at least one of the following rules: if the error location is determined to be inside the device between the first terminals of the first, second, and third switch, the third pattern comprises a switching configuration defining that the first, second, and third switches are in the open state; if the error location is determined to be inside the device between the load and the second terminal of the third switch, the third pattern comprises a switching configuration defining that the third switch is in the open state; if the error location is determined to be outside the device beyond the second terminal of the first switch, the third pattern comprises a switching configuration defining that the first switch is in the open state; if the error location is determined to be outside the device beyond the second terminal of the second switch, the third pattern comprises a switching configuration defining that the second switch is in the open state. The rules can be stored in the control unit or separate storage device.

It is understood that the error location can generally be one of the following: inside the device between the load and the second terminal of the third switch; inside the device between the first terminals of the first, second, and third switch ("on the node"); outside the device beyond the second terminal of the first switch, either remote (at least one device between the error location and the second terminal) or not remote (direct connection between the second terminal and the error location); outside the device beyond the second terminal of the second switch, (at least one device between the error location and the second terminal) or not remote (direct connection between the second terminal and the error location). It is understood that "outside the device" indicates any error location on the connection path extending from a respective second terminal of the first or second switch. Therefore, the border of the device between inside and outside is understood in an electrical sense at the second terminals of the first and second switch. This is in line with the definitions for "inside" and "outside" given further above.

While the device is preferably configured to determine all of the above error locations and to distinguish between these locations, it can be provided that the device is configured to determine only a subset of the error locations, if desired.

According to an embodiment, the error detection means comprise first current measurement means connected to the common node and configured to detect an overcurrent on the common node, preferably between the first terminals of the first and second switch, when the device is operated in the first mode. The error detection means comprise second current measurement means connected to the common node and configured to detect an overcurrent on the common node, preferably between the second current measurement means and the common node, when the device is operated in the second mode.

The first current measurement means preferably comprise a first resistor in series between the first terminals of the first and second switch, wherein the first resistor can be shunt resistor for measuring current. As the skilled person is aware, overcurrent means that the measured current violates a threshold condition (e.g. current is above a threshold), which is useful for detecting a short circuit or other types of errors causing an erroneous power state at the common node. It is understood that other means of measuring the erroneous power state can be used also, for example voltage measuring means.

According to an embodiment, the second current measurement means comprise a capacitor connected to the common node, wherein the second current measurement means are configured to charge the capacitor when the device is operated in the first mode and to discharge the capacitor when the device is operated in the second mode. The device can thus be configured to operate the current measurement means without an external power supply, in particular during operation in the second mode and without having supply from the power supply line. The second current measurement means can include a resistor, in particular shunt resistor, and a fourth switch, wherein a first terminal of the capacitor is connected to a second terminal of the fourth switch and a second terminal of the capacitor is connected to a predefined reference potential, in particular ground. A first terminal of the fourth switch can be connected to the common node. The control unit can be configured to set the switching state of the fourth switch to the open state if the device is operated in the first mode and to set the fourth switch to the closed state if the device is operated in the second mode, thereby operating the second current measurement means for measuring current towards the node in the presence of an erroneous power state due to an error location inside the device.

The second current measurement means preferably further comprise a diode connected between the common node and the first terminal of the capacitor, for example in parallel with the fourth switch. The diode is configured to enable power flow from the common node to the capacitor, thereby allowing charging of the capacitor when the device is supplied via the power supply line, in particular during regular operation in the first mode. The diode is configured to disable power flow from the capacitor through the diode in order to avoid undesired discharge of the capacitor. The diode can be formed by a switch, which is controlled by the error detection means or the control unit in order to implement the functionality of the diode.

In another aspect, a system comprising a plurality of electronic devices and a common power supply line is provided, wherein the plurality of electronic devices are configured according to one of the embodiments disclosed herein. The plurality of electronic devices are connected in series on the power supply line such that the second terminal of the first switch of a first of the electronic devices is directly connected to the second terminal of the second switch of a second of the electronic devices. This is to say that at least two adjacent switches are connected in the same way on the supply line. In this way, the first and second electronic devices can be connected directly adjacent to each other on the supply line. Preferably, all of the plurality of switches have the same orientation on the supply line, i.e. the devices are connected consistently to the supply line. In particular, the devices are connected to each other via the second terminals of the first and second switches, wherein the first switch is from one device and the second switch is from the left adjacent device. Exceptions can be provided for the very last devices on the supply line.

Preferably, all devices are configured in the same way, wherein for example the first and second time periods of the second pattern are identical for all the devices. In particular, the sequence of state configurations can be identical for all devices such that they are activated at the same time instances in all of the devices in response to an erroneous supply state detected during operation in the first mode.

The second pattern can include one or more interim state configurations between the first, second, third, or fourth state configurations. The interim state configurations can be set during a predefined offset time period. This allows improving implicit synchronization of the devices in the presence of slight deviations in speed between the devices during operation in the second mode. It is understood that the offset time period is preferably identical for all devices.

Preferably, the supply line is configured as a dc power supply line, wherein one or more dc power sources can be connected to one or both ends of the supply line. It is understood that the term power means electric power.

According to an embodiment, a first end of the supply line is connected to a first power source, wherein a second end of the supply line is connected to a second power source, wherein the electronic devices are connected to the supply line between the first and second end.

In another aspect, a method for operating at least one electronic device in series connection on a power supply line is provided. The at least one electronic device is preferably configured according to at least one of the embodiments disclosed herein. The method comprises: operating the error detection means during operation of the device in the first mode; operating the device in the second mode in response to an erroneous power state being detected by the error detection means during operation of the device in the first mode; operating the error detection means during operation of the device in the second mode in order to determine an error location being associated with the erroneous power state detected by the error detection means during operation of the device in the first mode.

It is understood that method features disclosed in connection with the device can be part of the method and vice versa.

In another aspect, the present disclosure is directed at a computer system, said computer system being configured to carry out several or all steps of the method described herein, which may be denoted as a computer implemented method. The control unit of device disclosed herein can comprise the computer system for carrying out the method.

The computer system may comprise a processing unit, at least one memory unit and at least one non-transitory data storage. The non-transitory data storage and/or the memory unit may comprise a computer program for instructing the computer to perform several or all steps or aspects of the method described herein.

In another aspect, the present disclosure is directed at a non-transitory computer readable medium comprising instructions for carrying out several or all steps or aspects of the method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

DRAWINGS

Figure 2:
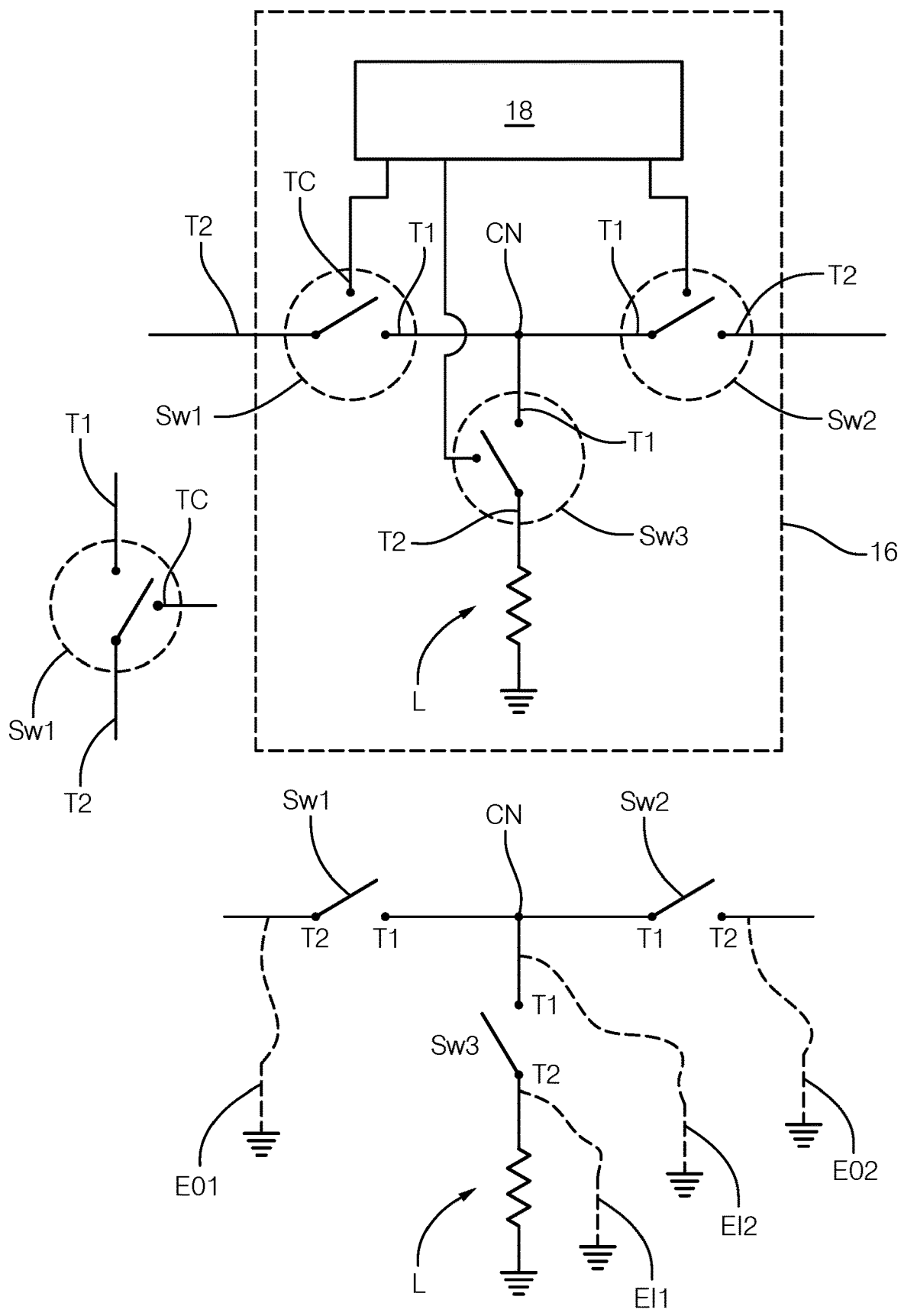
Figure 3:
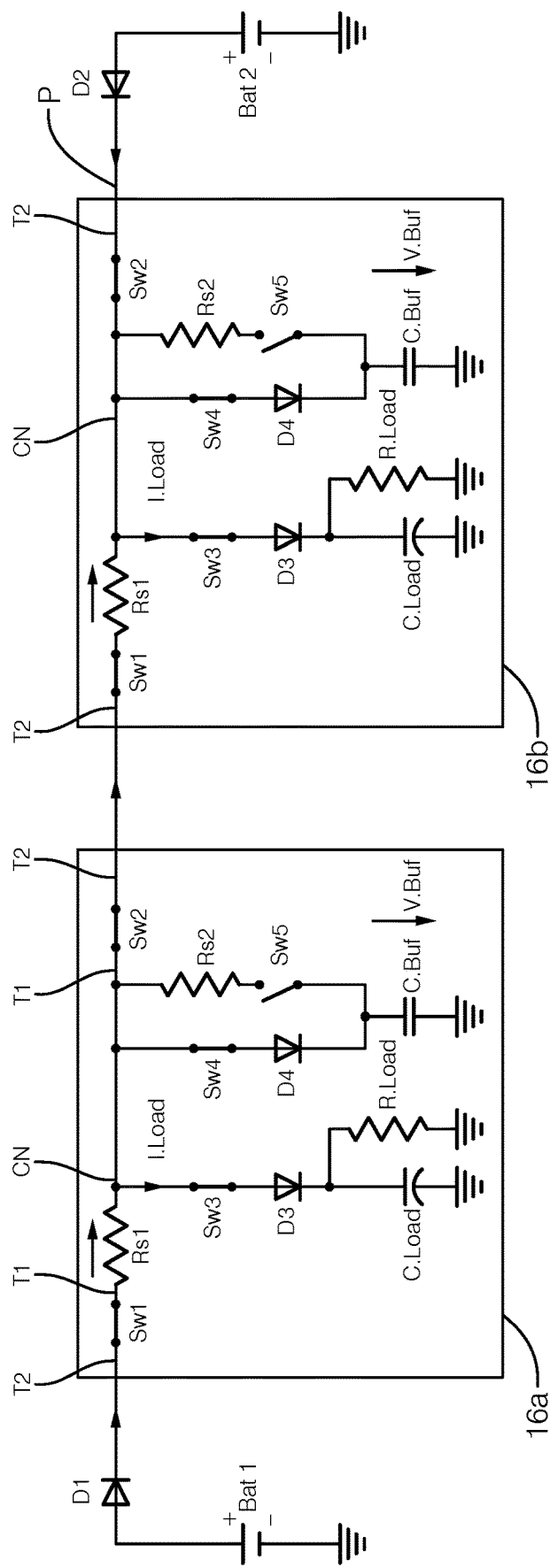
Figure 4:
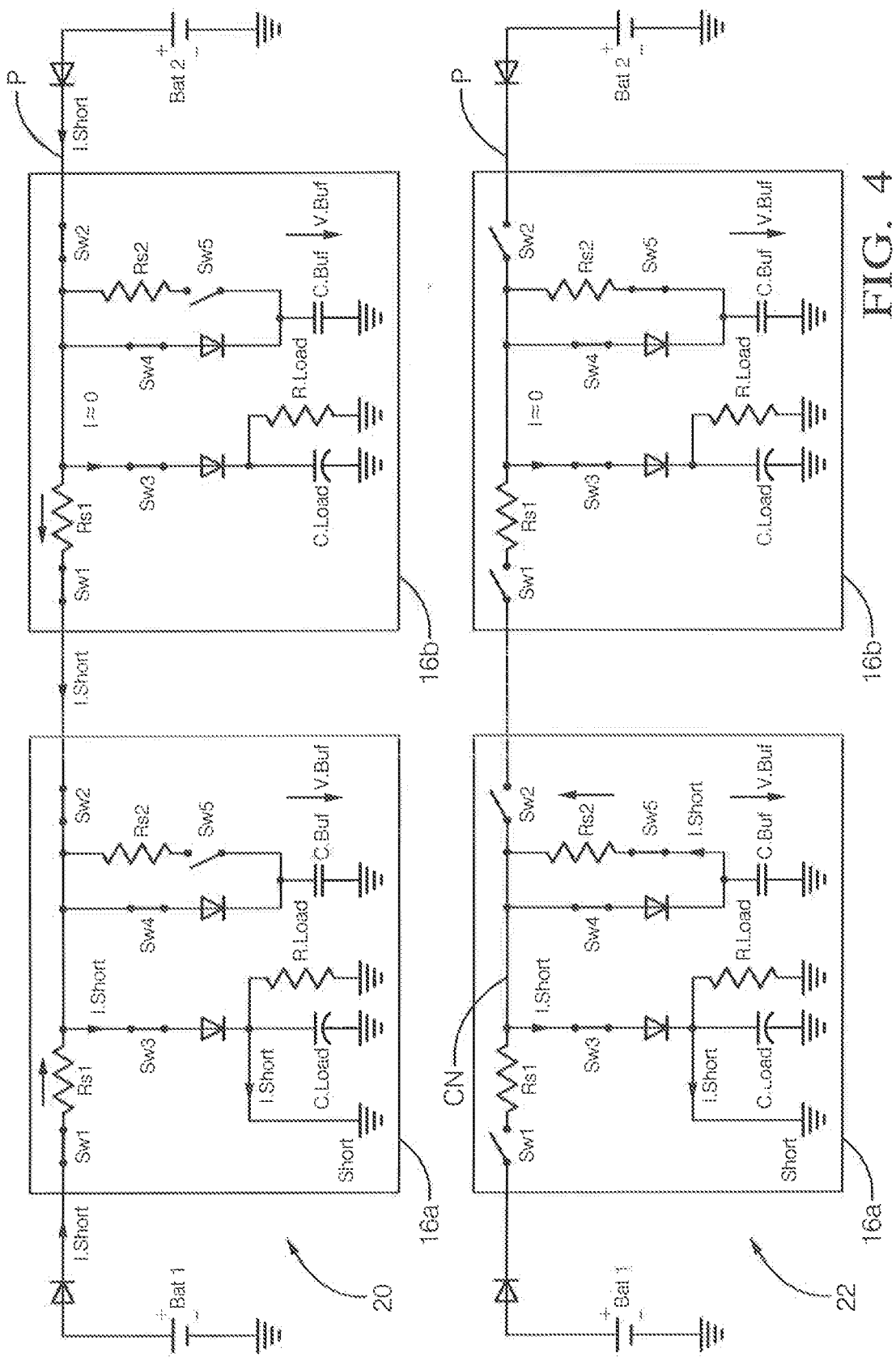
Figure 5:
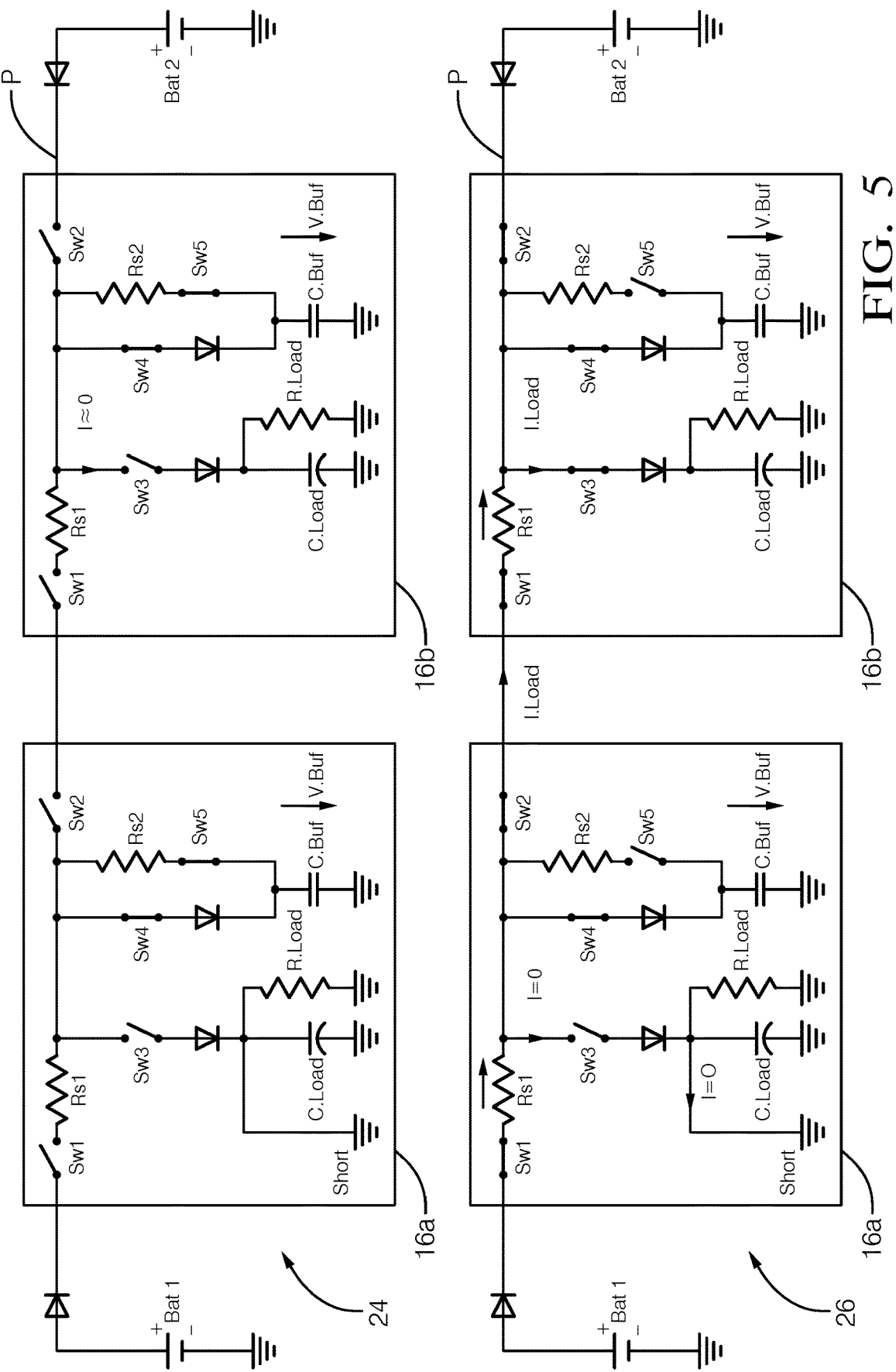
Figure 6:
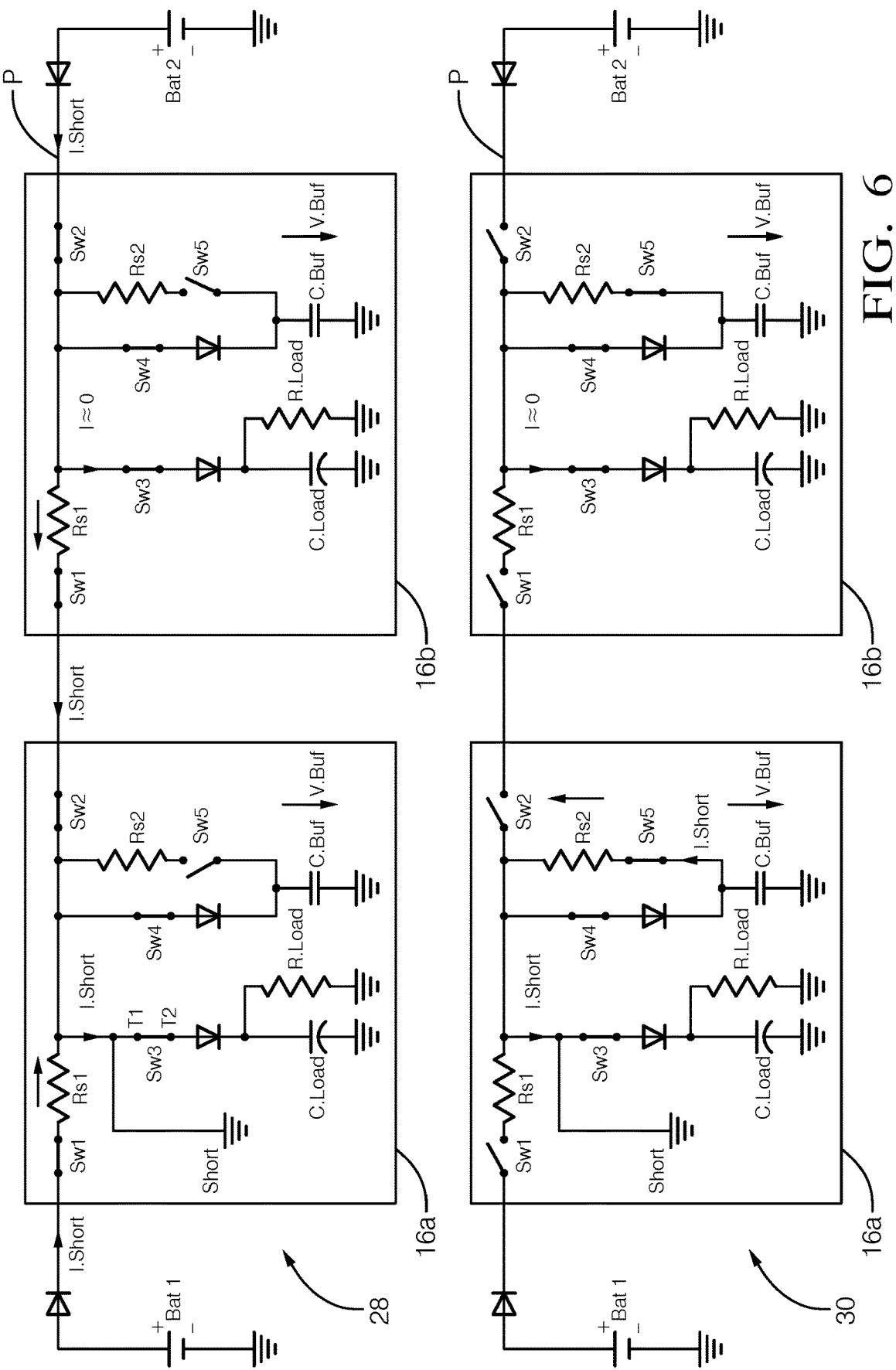
Figure 7:
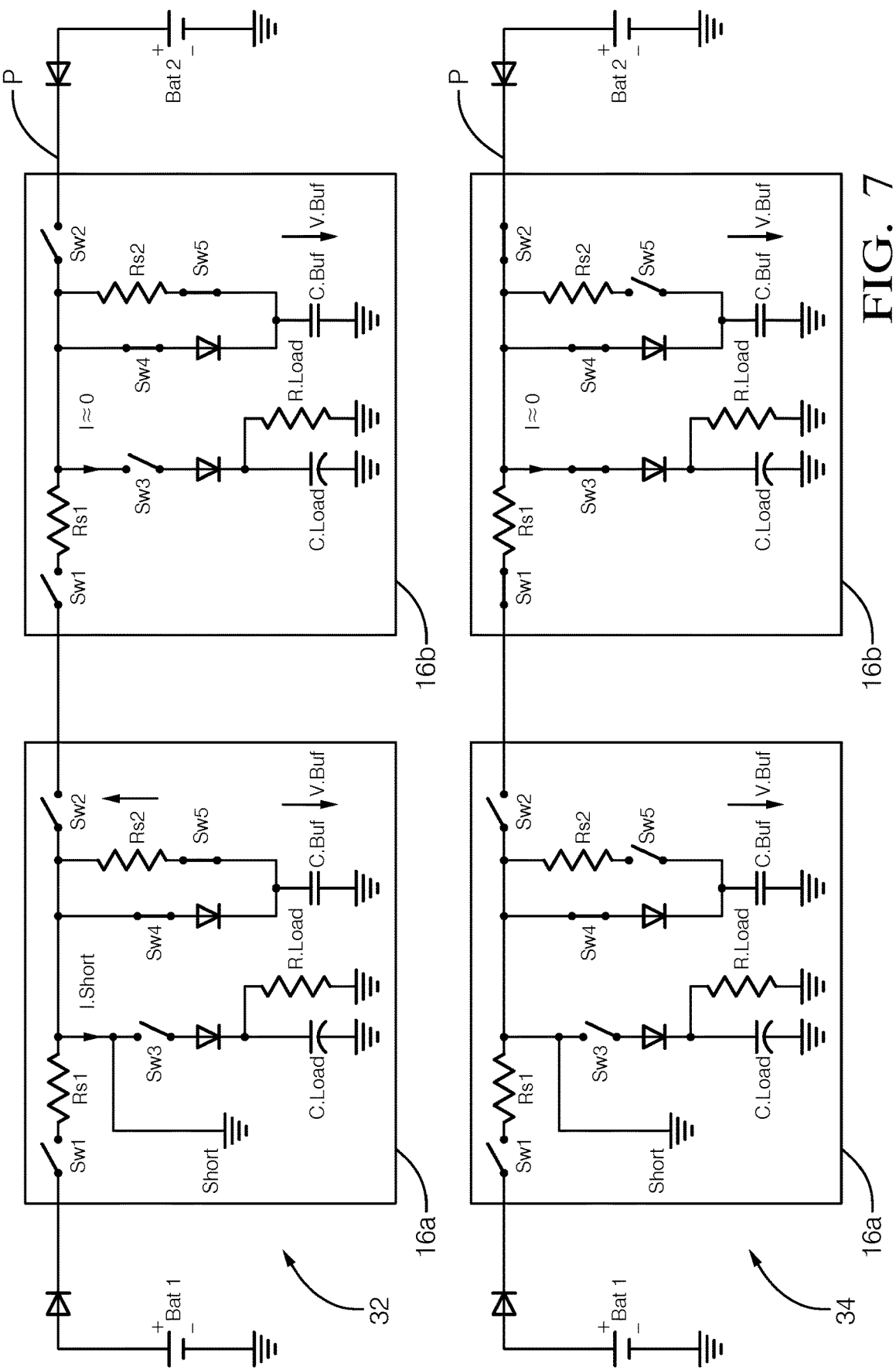
Figure 8:
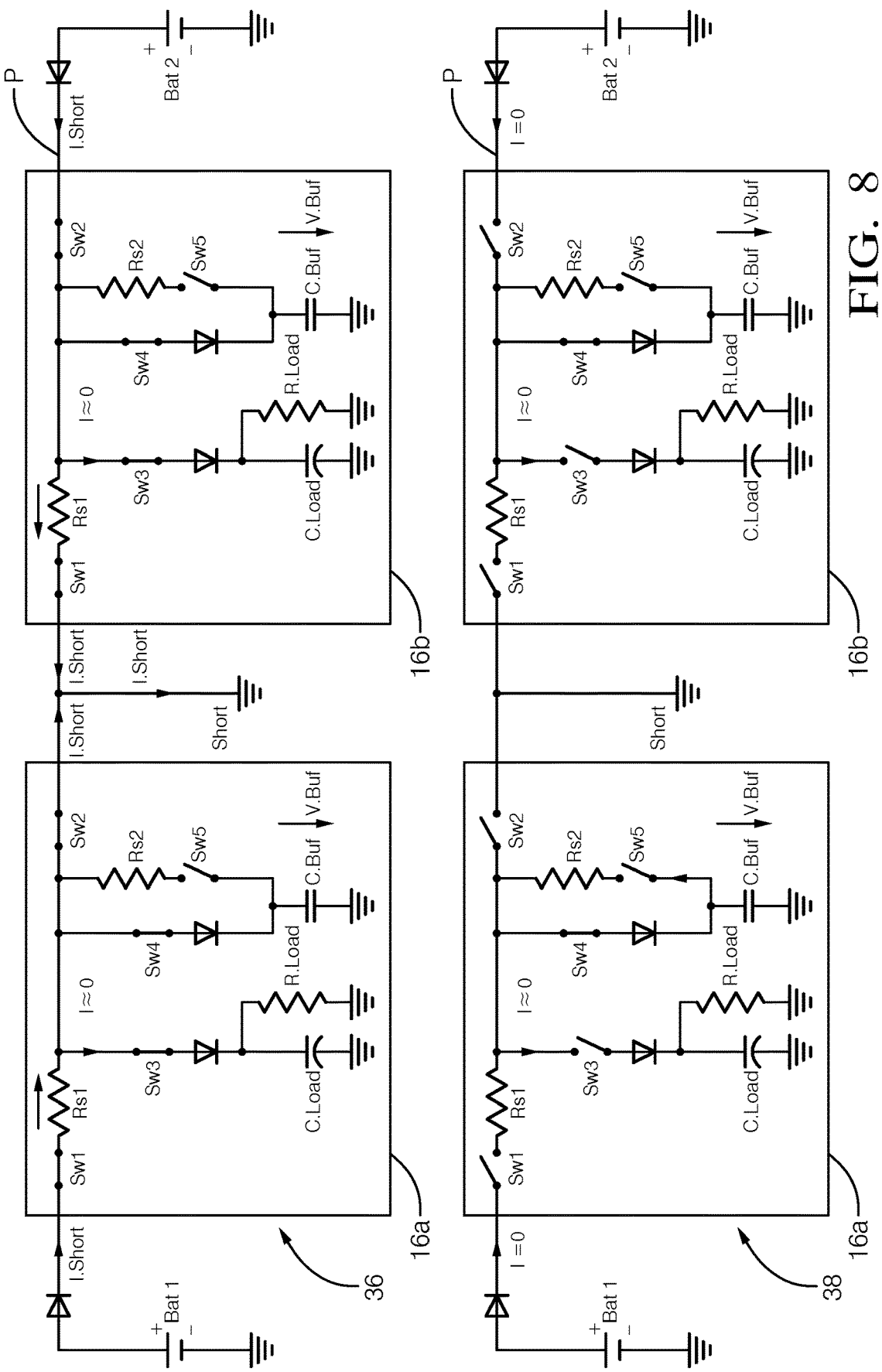
Figure 9:
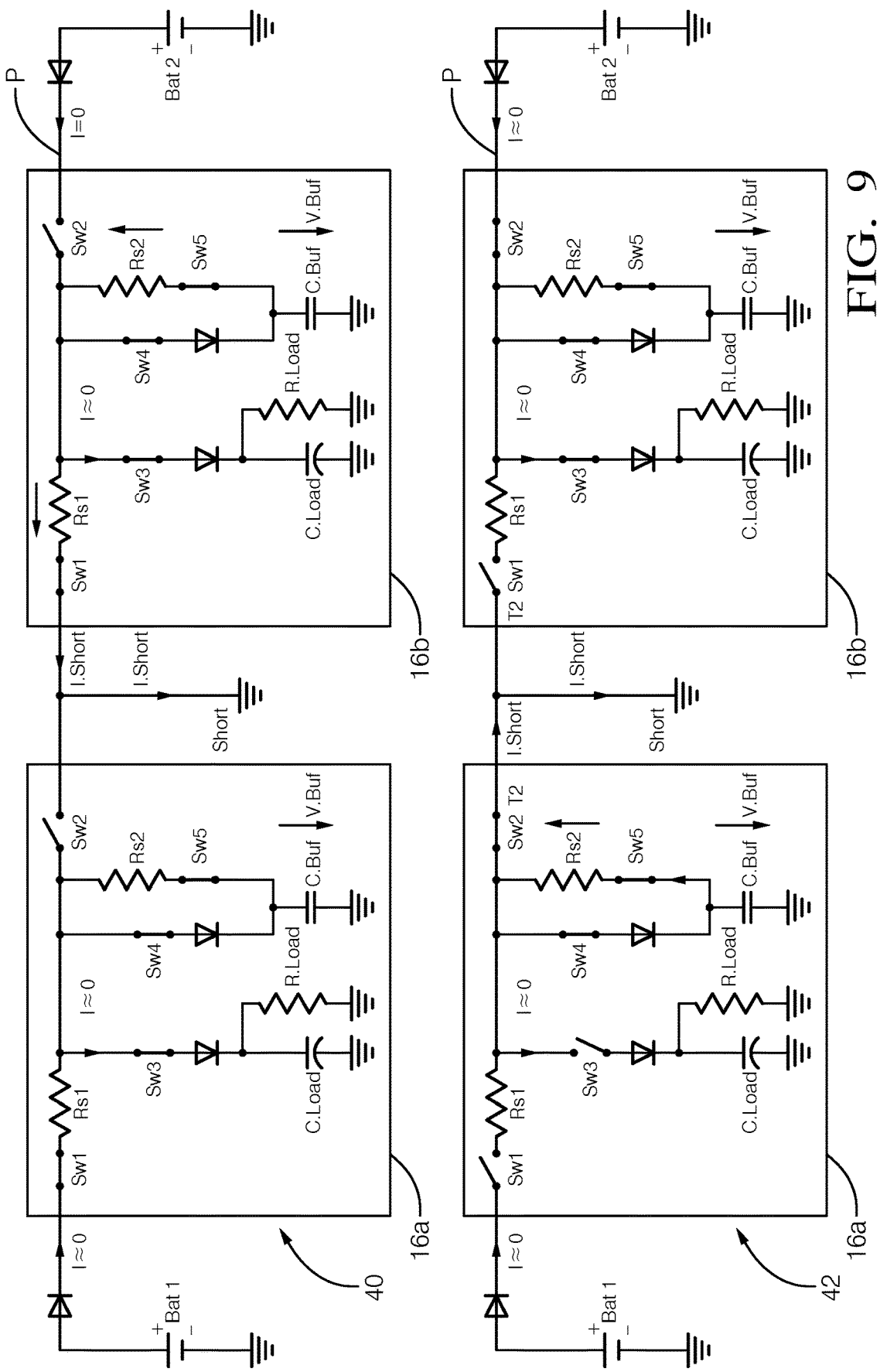
Figures 10, 11:
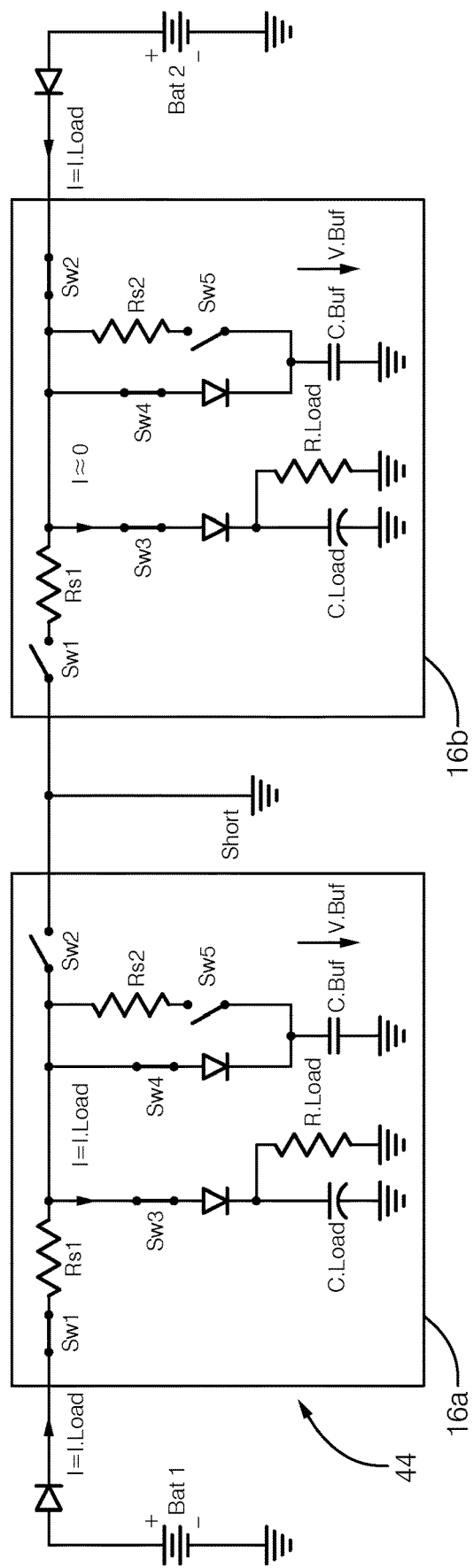
Figure 12:
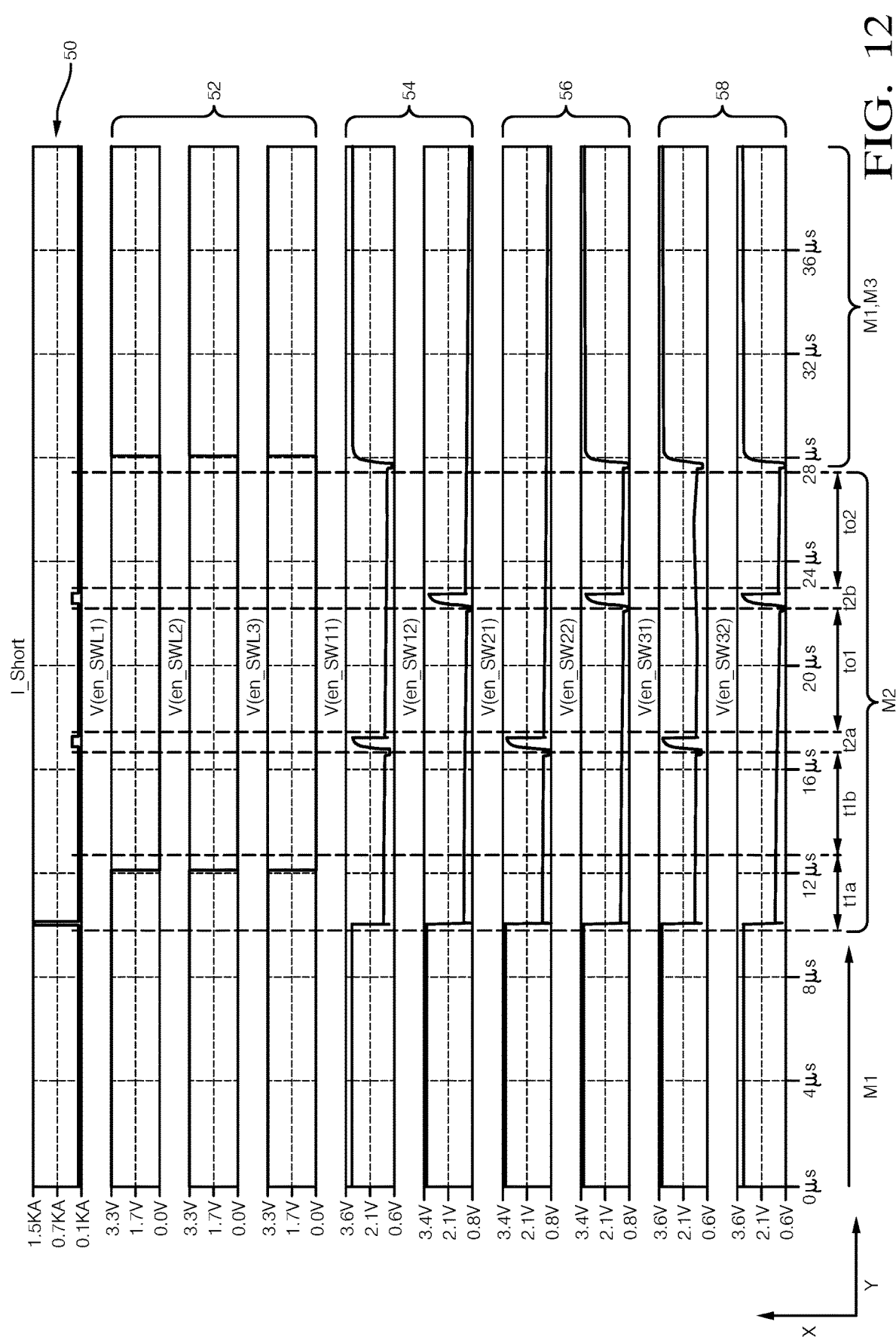

Exemplary embodiments and functions of the present disclosure are described herein in conjunction with the following drawings, showing:

FIG. 1—schematic illustrations of electronic devices connected in series on a power supply line;

FIG. 2—schematic illustration of an electronic device according to an exemplary embodiment and schematic illustration of possible error locations;

FIG. 3—schematic illustration of two electronic devices connected on a power supply line during operation in a first mode;

FIG. 4—schematic illustrations of the two electronic devices from FIG. 3 with a first error location inside the device and changing from a first mode to a second mode;

FIG. 5—schematic illustrations of two electronic devices from FIG. 3 with the first error location inside the device and changing from the second mode to a third mode;

FIG. 6—schematic illustrations of the two electronic devices from FIG. 3 with a second error location inside the device and changing from a first mode to a second mode;

FIG. 7—schematic illustrations of two electronic devices from FIG. 3 with the second error location inside the device and changing from the second mode to a third mode;

FIG. 8—schematic illustrations of the two electronic devices from FIG. 3 with a an error location outside the device and changing from a first mode to a second mode;

FIG. 9—schematic illustrations of two electronic devices from FIG. 3 with the error location outside the device during operation in the second mode;

FIG. 10—schematic illustrations of two electronic devices from FIG. 3 with the error location outside the device and changed from the second mode to a third mode;

FIG. 11—schematic illustrations of three electronic devices connected on a supply line;

FIG. 12—schematic time diagram of electric measurands during operation of the three electronic devices from FIG. 11; and FIG. 13—a table for illustrating exemplary switching states with respect to different error locations and combinations thereof.

DETAILED DESCRIPTION

In the figures, the same references signs are used for the same or corresponding elements.

FIG. 1 depicts three electric circuits 110, 112, 114, wherein in each of the circuits 110, 112, 114 three electronic devices 10a, 10b, 10c are connected in series on a power supply line P. A first end 12 of the power supply line P is connected to a first power source Bat1. Likewise, a second end 14 of the power supply line P is connected to a second power source Bat2, see for example circuit 110. The diodes D1 and D2 are connected between the outer devices 10a and 10c and the first and second power sources Bat1 and Bat2, respectively, so that no current can flow into the power sources Bat1 and Bat2.

In general, bidirectional current flow can be enabled between the power sources Bat1 and Bat2. In FIG. 1, the circuit 110 shows an example scenario in which the source voltage of the first power source Bat1 is lower than the source voltage of the second power source Bat2. The current I then flows from the second power source Bat2 through the supply line P in order to supply the devices 10a, 10b, and 10c with power during regular operation of the devices 10a, 10b, 10c. In this regard, the second power source Bat2 acts as primary supply and the first power source Bat1 acts as a secondary or backup supply. However, the situation can be different, i.e. the first power source Bat1 can supply the devices 10a, 10b, 10c parallel to the second power source Bat2 or instead of the second power source Bat2. The first and second power sources Bat1 and Bat2 can both be configured as batteries or as another energy storage device. Accordingly, the power supply line P can be configured as a DC supply line P.

The further circuits 112 and 114 correspond in general structure to the circuit 110 but illustrate the occurrence of an error in form of a short circuit ("short to GND") between the devices 10a and 10b, see circuit 112. In response to the short circuit, short-circuit currents I.Short.1 and I.Short.2 are flowing from the first power source Bat1 and the second power source Bat2 to the short circuit as illustrated in the circuit 112 (see dashed line).

In response to the short circuit currents I.Short.1 and I.Short.2 flowing from the power sources Bat1, Bat2 to the short circuit, an overcurrent will be measurable on the power supply line P. In general, the devices 10a, 10b, 10c are all provided with a fuse switch F, which will be set to the open state in response to an overcurrent detected in each of the devices, see circuit 114 in FIG. 1. Therefore, all of the fuse switches F will be opened if a short circuit occurs anywhere on the supply line P. This leads to the undesired situation in which none of the devices 10a, 10b, 10c will be operable due to the presence of a single error on the supply line P.

For improving the error handling, an electronic device 16 is described with reference to FIG. 2. The device 16 comprises a first switch Sw1, a second switch Sw2, and a third switch Sw3. Each of the switches Sw1, Sw2, Sw3 comprises a first terminal T1, a second terminal T2, and a control terminal TC. This is shown in greater detail for the switch Sw1 on the left side of the device 16.

The switching state of each of the switches Sw1, Sw2, Sw3 can be set to an open state or to a closed state by controlling the control terminal TC. In the open state, the first and second terminals T1 and T2 of the respective switch are isolated from each other, wherein power flow is disabled between the first and second terminals, T1, T2. In the closed state, the first and second terminals T1 and T2 of the respective switch are connected to each other, thereby enabling power flow between the first and second terminals T1 and T2. The switches Sw1, Sw2, Sw3 are preferably semiconductor switches, e.g. MOSFETs.

Having further regard to the device 16, the first terminals T1 of the first, second and third switches Sw1, Sw2, Sw3 are connected to each other, thereby forming a common node CN of the device 16. The second terminal T2 of the third switch Sw3 is connected to a load L, which is preferably part of the device 16 and connected to a predefined reference potential, preferably ground, as indicated in FIG. 2. The control terminals TC of the first, second and third switches Sw1, Sw2, Sw3 are controlled by a control unit 18 of the device 16. Although the control terminals TC are all connected to the same control unit 18 this does not mean that the switching states of the switches are necessarily all set to the same state. In fact, the switching state of each of the switches Sw1, Sw2, Sw3 can be set independently from another, as will become more apparent in the following.

It can be seen from FIG. 2 that the second terminals T2 of the first and second switches Sw1 and Sw2 form outlets of the device 16. This allows connecting the device 16 in series on a power supply line P, as will be explained in further detail in connection with FIG. 3.

It is understood that an area outside the device 16 can be defined in an electrical sense as an area that extends from the second terminals T2 of the first and second switches Sw1 and Sw2 away from the device 16. Likewise, an area inside the device 16 can be defined in an electrical sense to extend from the second terminals T2 of the first and second switch Sw1 and Sw2 inside of the device 16. Outer protection elements, such as a housing of the device 16 do not necessarily correspond to the same definition of inside and outside of the device 16.

Below the device 16 shown in FIG. 2 a portion of the device 16 is duplicated, namely the T-junction of the plurality of switches Sw1, Sw2, Sw3 and the load L. In addition, a plurality of different errors are indicated, namely a first external error EO1 located outside the device 16 beyond the second terminal T2 of the first switch Sw1, a second external error EO2 located outside the device 16 beyond the second terminal T2 of the second switch Sw2, a first internal error EI1 located inside the device 16 between the second terminal T2 of the third switch Sw3 and the load L, and a second internal error EI2 located inside the device 16 between the first terminals T1 of the plurality of switches Sw1, Sw2, Sw3, i.e. on the common node CN. All errors EO1, EO2, EI1, EI2 are indicated as short circuits, which is one typical type of error occurring in electric circuits.

In the following, it is described how the different errors EO1, EO2, EI1, EI2 indicated in FIG. 2 are handled in exemplary scenarios where two electronic devices 16a and 16b are connected in series on the power supply line P, see FIG. 3. It is preferred that the devices 16a and 16b and possible other devices connected on the supply line P are configured consistently as indicated for the device 16 in FIG. 2. As can be seen from FIG. 3 each of the devices 16a and 16b comprises further electrical elements in addition to the plurality of switches Sw1, Sw2, Sw3 and the load L. The load L is indicated as R.Load in FIGS. 3 to 10. The control units 18 of the devices 16a, 16b are not shown in these figures for better readability.

A capacitor C.Load is connected in parallel to the load R.Load, wherein the capacitor C.Load acts as a buffer capacitor so that supply of the load R.Load is temporarily held up if no power can be supplied via the power supply line P. Additionally, a diode D3 is connected between the second terminal T2 of the third switch Sw3 and the node connecting the capacitor C.Load and the load R.Load, wherein the diode D3 is forward biased towards the capacitor C.Load. The diode D3 prevents power flow from the capacitor C.Load to the common node CN, i.e. undesired discharge of the capacitor C.Load is avoided.

A first shunt resistor Rs1 is connected in series between the first terminals T1 of the first and second switches Sw1, Sw2, wherein the common node CN is formed between the first terminals T1 of the second and third switches Sw2, Sw3 and the first shunt resistor Rs1. The shunt resistor Rs1 is configured to measure current through the common node CN, wherein if the current violates a threshold condition, an overcurrent is detected. This is considered as an erroneous supply state at the common node CN because the overcurrent flows through the common node and regular power supply of the load R.Load is not possible. The erroneous supply state may also be detected by a sudden drop of voltage.

Each of the devices 16a and 16b is provided with a buffer capacitor C.Buf. The buffer capacitor C.Buf connects via a diode D4, fourth and fifth switches Sw4, Sw5, and a second shunt resistor Rs2 to the common node CN, wherein the diode D4 and the fourth switch Sw4 on the one hand, and the second shunt resistor Rs2 and the fifth switch Sw5 on the other hand are connected in parallel. The diode D4 is connected in series with the fourth switch Sw4, and the second shunt resistor Rs2 is connected in series with the fifth switch Sw5.

The second shunt resistor Rs2 is configured to measure current from the buffer capacitor C.Buf to the common node CN, wherein if the current violates a threshold condition, an overcurrent is detected, which is considered as an erroneous supply state.

It is understood that the loads R.Load of each of the devices 16a, 16b can be supplied by the power sources Bat1, Bat2 from either side of the devices 16a, 16b via the power supply line P during regular operation and in absence of an error. This is shown in FIG. 3, where both devices 16a, 16b are operating in a first mode in which the switching states of the plurality of switches Sw1 to Sw5 of each of the devices 16a, 16b are set according to a first pattern. As shown in FIG. 3, the first pattern comprises a state configuration defining that the first, second, and third switches Sw1, Sw2, Sw3 are set to the closed state, thereby enabling power flow through all of the switches Sw1, Sw2, Sw3. The fourth switch Sw4 is set to the closed state, thereby enabling charging of the buffer capacitor C.Buf to a storage voltage V.Buf. The diode D4 prevents discharge of the capacitor C.Buf in the event of an erroneous power state at the common node CN. The fifth switch Sw5 is set to an open state, thereby disabling power flow through the second shunt resistor Rs2. Current measurement with respect to the second shunt resistor Rs2 is thus deactivated during operation of the devices 16a, 16b in the first mode.

It is understood from FIG. 3 that the devices 16a, 16b are connected to the power supply line P such that the power line P extends through the devices 16a, 16b via the first and second switches Sw1, Sw2 and the common nodes CN. This means that the second terminal T2 of the first switch Sw1 is connected to a first section of the supply line P and the second terminal T2 of the second switch Sw2 is connected to a second section of the supply line P.

The occurrence and handling of the first error EI1 is described with regard to FIG. 4 and FIG. 5. FIG. 4 shows two operating states 20 and 22 of the circuit from FIG. 3. In the operating state 20, a short circuit has occurred between the load R.Load and the third switch Sw3 of the first device 16a. This causes a short-circuit current I.Short to flow from the first and second power sources Bat1, Bat2 through the devices 16a, 16b to the short circuit in the first device 16a, as indicated for the operating state 20 in FIG. 4. As a result of the short-circuit current I.Short flowing on the power supply line P through the devices 16a, 16b, an overcurrent will be detected by measuring the current through the first shunt resistors Rs1 of the first and second devices 16a, 16b. In response to the overcurrent, the operating mode of the devices 16a, 16b will be switched from the first mode (see first operating state 20) to the second mode at essentially the same time instance. In the second mode, the devices 16a, 16b are operated according to a second pattern, which is the same for both devices 16a, 16b, as will be described further with reference to FIG. 4 and FIG. 5.

The second pattern comprises a plurality of state configurations for the plurality of switches Sw1, Sw2, Sw3, Sw5. As a first step, as shown for the operating state 22 in FIG. 4, the first and second switches Sw1, Sw2 are set to the open state and the fifth switch Sw5 is set to the closed state, wherein current measurement through the second shunt resistor Rs2 is enabled while the devices 16a, 16b are isolated from the supply line P. It can be seen that a short circuit current I.Short is flowing from the buffer capacitor C.Buf through the second shunt resistor Rs2 and the common node CN to the short circuit inside the device 16a. However, as there is no short circuit inside the second device 16b, no short-circuit current is flowing through the second shunt resistor Rs2 of the second device 16b although the fifth switch Sw5 is closed.

Following the operating state 22 the state configuration of the switches is changed by setting the third switch Sw3 to the open state, which is shown for the operating state 24 in FIG. 5. No current is flowing any more through the second shunt resistor Rs2 of the first device 16a because the open third switch Sw3 now isolates the short circuit at the load R.load from the buffer capacitor C.Buf. It is thus determined by the device 16a that the error location is between the third switch Sw3 and the load R.load of the device 16a, i.e. the error is of the first internal type EI1. In contrast, the device 16b determines that the error location is not inside the device 16b.

Further switching state configurations are preferably activated afterwards in each of the devices 16a, 16b in order to perform a diagnosis for error locations outside the devices 16a, 16b, i.e. diagnosis with respect to the first and second external errors EO1, EO2. Such diagnosis will be described further below with reference to FIGS. 8 to 10 as no external error is present in the operational states 20 to 24.

After the error location has been determined in the operating state 24, the devices 16a, 16b change their mode from the second mode to another mode. The first device 16a has detected an internal error and changes its mode to a third mode in which the switches Sw1 to Sw5 are set to a third state configuration. The third state configuration is defined in dependence of the error location, wherein the first and second switches Sw1, Sw2 of the first device 16a are set to the closed state and the third switch Sw3 of the first device 16a is set to the open state, thereby allowing power flow through the device 16a but keeping the short circuit isolated from the power supply line P, as indicated for operational state 26 in FIG. 5. The fifth switch Sw5 is set to the open state thereby deactivating the current measurement through the second shunt resistor Rs2 and allowing recharging of the capacitor C.Buf.

The second device 16b has detected no error inside or outside the device 16b during operation in the second mode. Therefore, the error location is classified as remote because the erroneous power state was detected during the first mode but not during the second mode. The second device 16b returns to the first mode in which the switching states are set to the original first pattern, i.e. the first, second and third switches Sw1, Sw2, Sw3 are set to the closed state and the fifth switch Sw5 is set to the open state. The load R.Load of the second device 16b is supplied in a regular manner, see operational state 26 in FIG. 5.

The occurrence and handling of the second internal error EI2 is described with regard to FIG. 6 and FIG. 7. In the operational state 28 shown in FIG. 6, a short circuit has occurred in the first device 16a between the first terminal T1 of the third switch Sw3 and the common node CN. As a result, short-circuit currents I.Short are flowing from the first and second power sources Bat1, Bat2 through the devices 16a, 16b to the short circuit of the first device 16a. Therefore, overcurrent flowing through the first shunt resistors Rs1 is detected. In response to the detected overcurrent, the devices 16a and 16b activate the second mode, wherein the switches are set to various state configurations. In particular, the state configuration of the operational states 22 and 24 of FIG. 4 and FIG. 5 are set accordingly, wherein the state configurations of operational states 22 and 24 correspond to the operational state 30 of FIG. 6 and the operational state 32 of FIG. 7, respectively. As can be seen from operational states 30 and 32 short-circuit currents I.Short are flowing in both cases in the first device 16a. Therefore, the error location is determined by the first device 16a to match with the second internal error EI2. As for the previous error case EI1, the second device 16b determines the error location to be remote from the second device 16b. In response to the determined error locations, the first device 16a sets the switching states of the switches according to a third state configuration in which the first, second, and third switches Sw1, Sw2, Sw3 are set to the open state, as can be seen for the operational state 34 in FIG. 7. In addition, the fifth switch Sw5 is set to the open state. Thus, the first device 16a is completely disconnected from the power supply line P. In contrast, the second device 16b returns to the first mode, as can be seen from the operational state 34 of FIG. 7, which corresponds to the operational state 26 of FIG. 5 with respect to the second device 16b.

The occurrence and handling of the first and second external errors EO1 and EO2 is described with reference to FIGS. 8 to 10. As can be seen from operational state 36 in FIG. 8, a short circuit occurred on the power supply line P between the first device 16a and the second device 16b. As a result, short-circuit currents I.Short are flowing from both power sources Bat1, Bat2 to the short circuit. In response to the detected overcurrent I.Short, both devices 16a, 16b switch to the second mode, wherein a plurality of state configurations are set according to the second pattern as discussed in connection with FIGS. 4 to 7. However, as the error location is outside of both devices 16a, 16b no short-circuit current is flowing while the first and second switches Sw1, Sw2 of both devices 16a, 16b are open. This is indicated by operational state 38 in FIG. 8 in which the short circuit is isolated.

The state configurations are then set as shown for operational state 40 in FIG. 9. The switching state of the second switch Sw2 is set to the open state, wherein all other switches are set to the closed state. A short-circuit current I.Short is then flowing from the buffer capacitor C.Buf of the second device 16b through its second shunt resistor Rs2 to the short circuit. In contrast, no short-circuit current is flowing from the first device 16a to the short circuit because the second switch Sw2 of the first device 16a is open. It can be seen that both devices 16a, 16b have the same state configuration.

Another state configuration is set as shown for operational state 42 in FIG. 9. According to this state configuration the first switch Sw1 is set to the open state while all of the other switches are set to the closed state. The first device 16a is connected to the short circuit, wherein a short-circuit current is flowing from the buffer capacitor C.Buf through the second shunt resistor Rs2 to the short circuit. However, since the second device 16b is not connected to the short circuit in this state configuration, no short-circuit current is measured by the second device 16b.

In the operational state 42, the first device 16a determines the error location to be beyond the second terminal T2 of the second switch Sw2, i.e. the error is of the type EO2. In contrast, the second device 16b determines the error location to be beyond the second terminal T1 of the first switch Sw1, i.e. the error is of the type EO1. In response to the determined error locations, both devices 16a, 16b activate the third mode with a third state configuration in dependence of the determined error locations. The result is shown for the operational state 44 in FIG. 10. In the first device 16a, the first switch Sw1 and the third switch Sw3 are set to the closed state, wherein the second switch Sw2 and the fifth switch Sw5 are open. Therefore, the first device 16a is supplied via the power supply line P from the first power source Bat1 and continued supply of the load R.Load is ensured while the first device 16a is isolated from the short circuit between the first and second devices 16a, 16b. During the second mode, the load R.Load is still supplied by charge stored on the capacitor C.Load.

In the second device 16b, the first switch Sw1 is set to the open state and the second and third switches Sw2, Sw3 are both set to the closed state, thereby ensuring power supply of the load R.Load via the power supply line P connected to the second power source Bat2. The fifth switch Sw5 is set to the open state, thus allowing recharging of the buffer capacitor C.Buf. Due to the open first switch Sw1 the second device 16b is also isolated from the short circuit.

It is understood that the switching state of the fourth switch Sw4 does not change in the previous examples. It can be provided that the fourth switch Sw4 is used to mimic the behavior of the diode D4 so that the diode D4 would not be necessary. Alternatively, the switch Sw4 can be omitted.

FIG. 11 schematically shows a circuit in which the devices 16a, 16b, 16c are connected in series on a single supply line P. Each of the devices 16a, 16b, 16c comprises at least three switches, which are configured the same way as the first, second, and third switches Sw1, Sw2, Sw3 shown in FIGS. 3 to 10. However, in order to better distinguish the switches between the devices 16a, 16b, 16c, the first, second, and third switches are denoted as (SW11, SW12, SWL1), (SW21, SW22, SWL2), and (SW31, SW32, SWL3) for the first, second and third devices 16a, 16b, 16c, respectively. In order to further exemplify the error handling, it is described how each of the devices 16a, 16b, 16c reacts to a short circuit located between the first device 10a and second device 10b, as shown in FIG. 11. For this purpose, a plurality of electric measurands within the circuit of FIG. 11 are illustrated over time in FIG. 12, wherein an axis x represents the scale of electric measurands and an axis y represents the timescale. The numerical values given for the axis x and the axis y are only an example and different values are possible depending on the particular circuit.

Diagram 50 in FIG. 12 indicates short circuit current I_short flowing in the circuit of FIG. 11. Diagrams 52 indicate the control voltage of the control terminals TC of the third switches SWL1, SWL2, SWL3 of the first, second, and third devices 16a, 16b, 16c (control terminals TC not shown in FIG. 11). Likewise, diagrams 54, 56, 58 indicate the control voltage of the control terminals TC of the first and second switches (SW11, SW12), (SW21, SW22), (SW31, SW32) of the first, second, and third devices 16a, 16b, 16c, respectively. It can be seen that the voltage levels essentially vary between a high value and a low value. During the high value, the respective switch is in the closed state, wherein the open state is activated during the low value. Depending on the switch technology, this behavior can also be different.

Beginning from the left side of FIG. 12, the state configuration of the switches is according to the first mode M1, wherein all switches are closed, i.e. the control terminals TC have high level voltages. No overcurrent is detected. Then, at the beginning of a first portion t1a of a first time period, the short circuit occurs between the first device 16*a* and the second device 16*b*, see FIG. 11. This causes an overcurrent, which can be seen as a peak in the diagram 50. At the same time, all devices 16*a*, 16*b*, 16*c* switch to the second mode, wherein a first state configuration is activated in all devices 16*a*, 16*b*, 16*c*. The first state configuration is defined by the first and second switches set to the open state and the third switch set to the closed state, which may be written as (o, o, c) with "o" denoting open and "c" denoting closed.

After the first portion t1*a* of the first time period, a second state configuration is activated during a second portion t1*b* of the first time period. The second state configuration is defined as (o, o, o), i.e. all switches are open. As can be seen from diagram 50, no overcurrent occurs.

After the second portion t1*b* of the first time period, a third state configuration is set during a first portion t2*a* of a second time period, wherein the third state configuration is defined as (c, o, o). This is, the "left switches" SW11, SW21, SW31 are closed, while the "right switches" SW12, SW22, SW32 are open, and the third switches SWL1, SWL2, SWL3 are open. An overcurrent, which is visible in diagram 50 as a small peak, will be measured by the second device 16*b* but not by the other devices 16*a*, 16*c*. After the first portion t2*a* of the second time period, all switches are set according to a fifth state configuration (all switches open again) during a first offset time period to1.

After the first offset time period to1, a sixth state configuration is set during a second portion t2*b* of the second time period. The sixth state configuration defines that the "right switches" SW12, SW22, SW32 are closed, while the "left switches" SW11, SW21, SW31 are open, i.e. (o, c, o). An overcurrent, which is visible in diagram 50 as a small peak during time period t2*b*, will be measured by the first device 16*a* but not by the other devices 16*b*, 16*c*. After the second portion t2*b* of the second time period, all switches are set according to a seventh state configuration (all switches open again) during a second offset time period to2.

The time periods in which the sequence of the first to seventh state configurations are set, i.e. time periods t1*a*, t1*b*, t2*a*, to1, t2*b*, to2, are time periods in which the second mode M2 is activated in all of the devices 16*a*, 16*b*, 16*c*. The sequence of state configurations can be regarded as a fixed diagnosis program, which is initiated by the overcurrent flowing of the power supply line P due to the short circuit between the devices 16*a* and 16*b*. The offset time periods to1, to2 help to ensure an indirect synchronization between the devices 16*a*, 16*b*, 16*c*. Therefore, small differences between the devices 16*a*, 16*b* will not cause an undesired time overlap between different state configurations set for the devices. Each device acts by itself and an explicit synchronization is not necessary.

After the second mode M2, the first device 16*a* determined the error location to be of the second external type EO2, the second device 16*b* determined the error location to be of the first external type EO1, and the third device 16*c* determines the error location to be remote. In response to the determined error locations, third modes M3 are activated for the first and second devices 16*a*, 16*b*, with third state configurations set in dependence of the determined error location. The third state configurations are (c, o, c) for the device 16*a*, and (o, c, c) for the second device 16*b* as can be seen from the diagrams 54 and 56 in FIG. 12. The first mode M1 is activated for the third device 16*c*, wherein the original state configuration (c, c, c) is set, see diagram 58. As can be seen from diagram 50 no short-circuit current is flowing anymore so the short circuit is isolated from all devices 16*a*, 16*b*, 16*c* and the loads L of all devices are supplied via the supply line P.

FIG. 13 provides an overview of possible error state combinations 46, which are combinations of errors that can in principle occur with respect to anyone of the devices 16*a*, 16*b*, or 16*c*. "Rail short left" indicates a short circuit outside the device beyond the second terminal T2 of the first switch Sw1, i.e. error EO1. An entry "yes" indicates the occurrence of a short circuit, wherein "no" indicates that the error has not occurred. In the same manner, the second, third, and fourth columns of the table of FIG. 13 indicate the errors EO2, EI1, EI2, respectively. For each of the error state configurations 46, an associated switching state configuration 48 is given in the table of FIG. 13. It is understood that for each possible error state configuration 46 a suitable state configuration for the first, second, and third switches is provided per row. "Rail Switch Left" indicates the first switch Sw1, "Rail Switch Right" indicates the second switch Sw2, and "Load Switch" indicates the third switch Sw3. The term "open" indicates the open state and "closed" indicates the closed state. By setting the switching state configuration 48 in response to the determined error locations of the error state configurations 46 safe operability of the devices is maximized.

We claim:

1. An apparatus, comprising:
 a plurality of switches each having a plurality of operating states; and
 a control unit configured to:
   control the operating states of the switches in a first mode to provide power to the apparatus,
   determine an error condition during the first mode,
   control the operating states of the switches in a second mode including a plurality of operating states for at least one of the switches,
   identify a source of the error condition during the second mode,
   control the operating states of the switches in a third mode to avoid the error condition, wherein at least one of the switches has a first operating state in the first mode and a different operating state in the third mode.

2. The apparatus of claim 1, wherein
 the plurality of switches includes at least a first switch, a second switch, and a third switch;
 the first mode includes a first pattern of operating states in which
   the first switch is in an open state and the second and third switches are in a closed state,
   the second switch is in the open state and the first and third switches are in the closed state, or
   the first, second, and third switches are in the closed state;
 the second mode includes a second pattern of operating states in which
   the first, second, and third switches are in the open state,
   the first and second switches are in the open state and the third switch is in the closed state,
   the first switch is in the closed state, the second switch is in the open state, and the third switch is in the open or closed state, or
   the first switch is in the open state, the second switch is in the closed state, and the third switch is in the open or closed state.

3. The apparatus of claim 2, wherein
the second mode comprises a first time period in which the operating states are set according to at least one of a first state configuration or a second state configuration,
the first state configuration includes the first and second switches in the open state and the third switch in the closed state,
the second state configuration includes the first, second, and third switches in the open state, and
if the error condition is detected during the first time period, the source of the error condition is determined to be between the switches.

4. The apparatus of claim 3, wherein
each of the switches has a first terminal, a second terminal, and a control terminal;
the first terminal of the first switch, the first terminal of the second switch, and the first terminal of the third switch are connected to a common node;
the second terminal of the first switch and the second terminal of the second switch are for connection to a first section and a second section of a power supply line, respectively, so that the power supply line extends through the device via the common node if the first section and the second section are connected to the second terminals of the first switch and the second switch, respectively;
the first time period comprises a first portion in which the operating states are set according the first state configuration;
the first time period comprises a second portion in which the operating states are set according to the second state configuration;
if the error condition is detected during the first portion of the first time period but not during the second portion of the first time period, the source of the error condition is determined to be between the first terminals of the first, second, and third switches; and
if the error condition is detected during the first and second portion of the first time period, the source of the error condition is determined to be between the load and the second terminal of the third switch.

5. The apparatus of claim 4, wherein
the second pattern comprises a second time period in which the operating states are set according to at least a third state configuration or a fourth state configuration;
the third state configuration includes the first switch in the closed state, the second switch in the open state, and the third switch in the open or closed state;
the fourth state configuration includes the first switch in the open state, the second switch in the closed state, and the third switch in the open or closed state; and
if the error condition is detected during the second time period, the source of the error condition is determined to be outside of the apparatus.

6. The apparatus of claim 5, wherein
the second time period comprises a first portion in which the operating states are set according to the third state configuration;
if the error condition is detected during the first portion of the second time period, the source of the error condition is determined to be outside the apparatus beyond the second terminal of the first switch;
the second time period comprises a second portion in which the switching states are set according to the fourth state configuration; and
if the error condition is detected during the second portion of the second time period, the source of the error condition is determined to be outside the apparatus beyond the second terminal of the second switch.

7. The apparatus of claim 4, comprising at least one first current measurement component and at least one second current measurement component, and wherein:
the at least one first current measurement component is connected to the common node;
the at least one first current measurement component detects an overcurrent on the common node, between the first terminals of the first and second switch, during the first mode; and
the at least one second current measurement component is connected to the common node;
the at least one second current measurement component detects an overcurrent on the common node, between the at least one second current measurement component and the common node, during the second mode.

8. The apparatus of claim 7, wherein
the at least one second current measurement component comprises a capacitor connected to the common node,
the capacitor is charged during the first mode, and
the capacitor is discharged during the second mode.

9. A system comprising a power supply line and a plurality of the apparatus of claim 1 connected in series on the power supply line with a terminal of one of the switches of a first one of the apparatus connected to a terminal of one of the switches of a second one of the apparatus.

10. The system according to claim 9, wherein
a first end of the power supply line is connected to a first power source,
a second end of the power supply line is connected to a second power source, and
the plurality of apparatus are connected to the supply line between the first and second end.

* * * * *